United States Patent [19]
Loshbough

[11] 3,866,171
[45] Feb. 11, 1975

[54] DISPLAY VERIFIER

[75] Inventor: Richard C. Loshbough, Temperance, Mich.

[73] Assignee: Reliance Electric Company, Toledo, Ohio

[22] Filed: Jan. 18, 1974

[21] Appl. No.: 434,606

[52] U.S. Cl. ........ 340/146.1 C, 235/153 A, 340/336
[51] Int. Cl. ........................ H03k 13/32, G08b 9/06
[58] Field of Search ................ 235/153 A, 153 AC; 315/129; 340/146.1 R, 146.1 C, 324 R, 336

[56] References Cited
UNITED STATES PATENTS
3,626,367  12/1971  Howard et al. ............. 344/336 UX
3,753,226   8/1973  Schnurmann et al. ....... 340/146.1 C

*Primary Examiner*—Felix D. Gruber
*Assistant Examiner*—R. Stephen Dildine, Jr.
*Attorney, Agent, or Firm*—Thomas H. Grafton

[57] ABSTRACT

An improved circuit for verifying that a digital display and particularly a display formed from seven-segment gas discharge indicators is operating correctly. Cathodes of the indicator segments are driven from decoded BCD display data. The cathode of each segment is connected through a monitoring circuit to a 7-bit comparator where the actual operation of the segment is compared with the original display data. An error signal is generated if any segment fails to illuminate or extinguish in accordance with the data or if a segment is open or short-circuited. A test switch is provided for temporarily simulating an error to produce an error signal for test purposes. The circuit is adaptable for use with multiple digit displays wherein the display data is provided to the individual digits by means of multiplexing.

7 Claims, 3 Drawing Figures

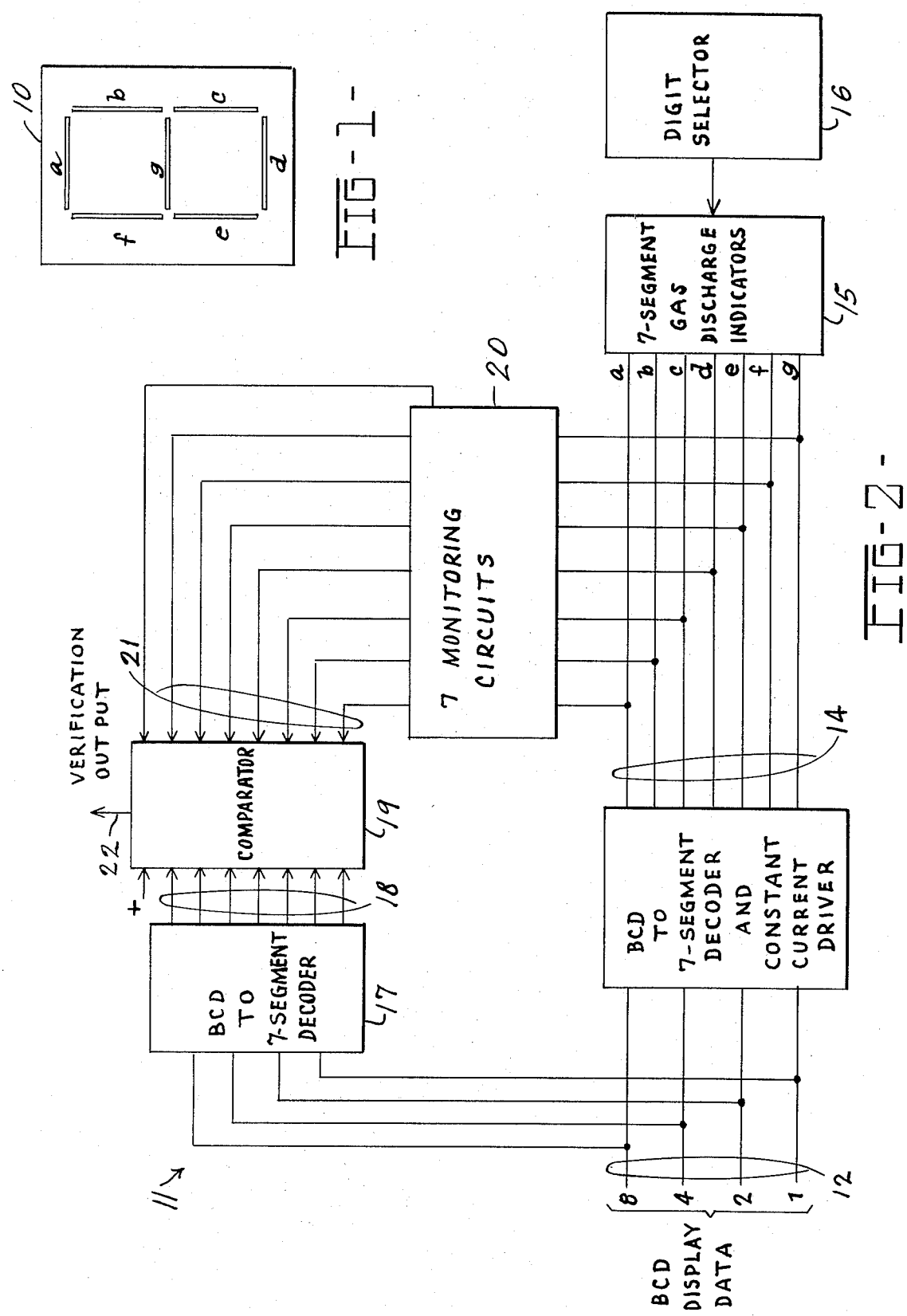

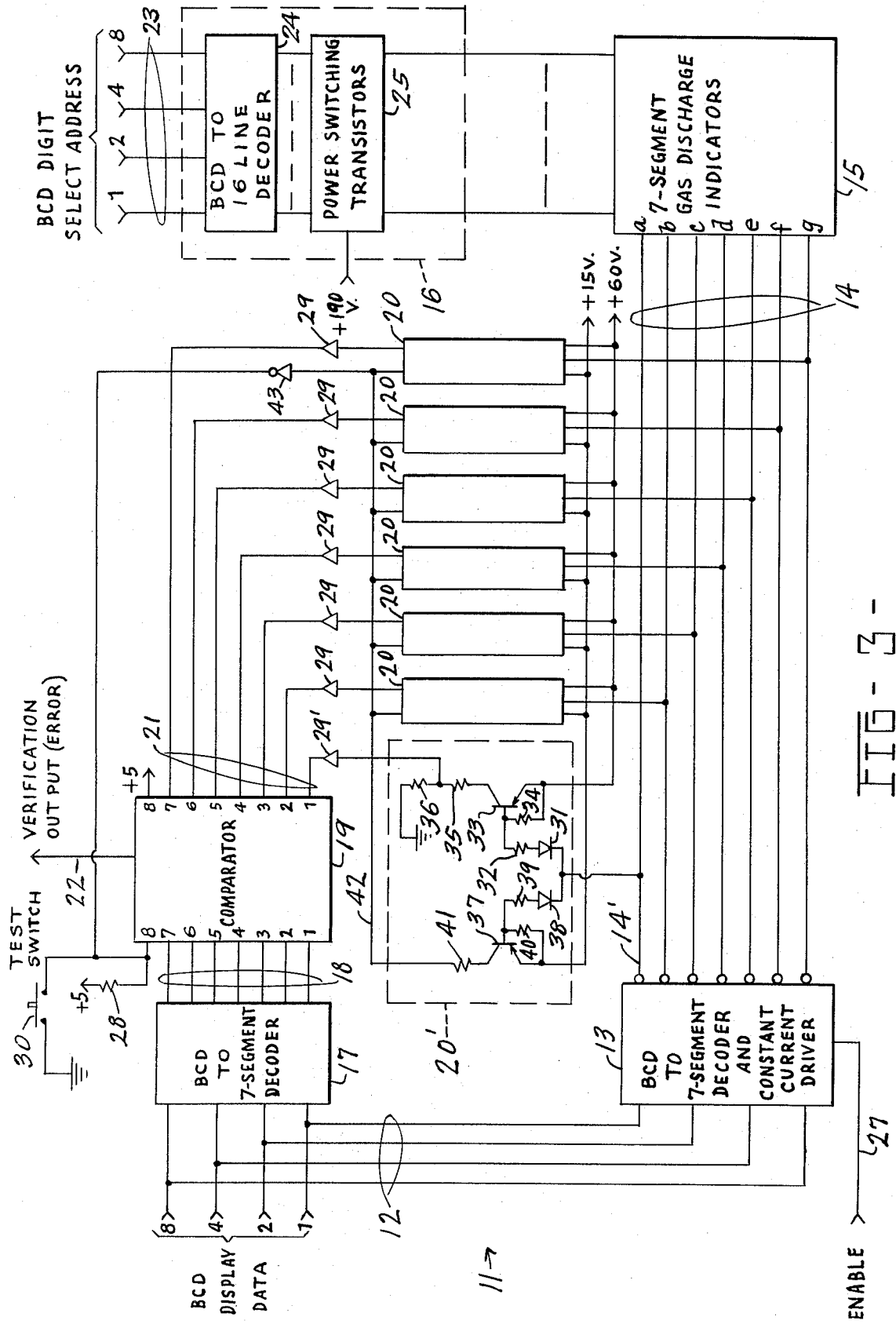

DISPLAY VERIFIER

BACKGROUND OF THE INVENTION

This invention relates to error detection and more particularly to an improved circuit for verifying that a digital display is operating correctly.

With the development of digital circuitry and particularly of digital circuitry involving integrated circuit techniques, the use of digital displays has become increasingly important. Digital displays are now commonly used, for example, on calculators, in scale or weight measuring systems and to replace analog gauges and readouts in various measuring and control systems. Due to the low cost, seven-segment readout devices are commonly used for digital numeric indicators. By illuminating various combinations of the seven segments, the numbers zero through nine may be formed. The individual segments may be illuminated by various techniques such as by means of incandescent lamps, light emitting diodes, gas discharge tubes or electroluminescence. However, each of the commonly used devices may be subject to failure. Failure may occur as a result of an open circuit or a short circuit in one or more segments or as a result of a fault in the circuitry for energizing a segment. One difficulty with the segment type readout devices is that the failure of one segment may cause the device to indicate an erroneous number. If, for example, the uppermost segment has failed, the number 7 will appear as a number 1.

Various circuits have been proposed in the prior art for detecting failures or faults in segment type readout devices. In devices involving incandescent lamps, for example, circuits have been designed for detecting an open filament on any energized lamp. However, such devices generally do not indicate the failure of an unenergized lamp. Nor will such circuits verify that each segment that should be illuminated is in fact illuminated and that each segment that should be off is in fact off.

SUMMARY OF THE INVENTION

According to the present invention, an improved circuit is provided for verifying the correct operation of digital displays such as those composed of one or more seven-segment indicators. The circuit is particularly suitable for use with gas discharge illuminated displays. Each segment of the display is monitored for short circuit conditions as well as for the proper operation in accordance with the data to be displayed.

The display data is applied to the circuitry from an external source and is preferably in a binary coded digit (BCD) format. The display data is applied through a BCD-to-seven segment decoder to selectively energize the cathodes of gas discharge tubes which form the seven segments. The voltage level at each cathode is monitored for supplying signals relating to the operation of the segments to one group of inputs to a comparator. The BCD display data from the external source is also applied through a separate BCD-to-seven segment decoder to a second group of inputs to the comparator. As long as the seven segments are functioning properly, the comparator will generate an output signal verifying that the display is operating correctly. In the absence of a comparison, the comparator will generate an error signal to indicate the failure of the display or its related drive circuitry.

The circuit is also suitable for use with a display composed of a plurality of indicators to which display data is multiplexed. Cathodes of like segments for all indicators are connected together while the anodes for the segments in only one indicator are excited at any given instant. The circuit then verifies the operation of the indicator in which the anodes are excited. As the different indicators are successively excited, the operation of each is verified.

Accordingly, it is a preferred object of the invention to provide an improved circuit for monitoring the operation of a digital indicator.

Another object of the invention is to provide an improved circuit for monitoring for the correct operation of each segment of a segment type readout device.

Still another object of the invention is to provide a circuit for verifying that each segment of a gas discharge segment type readout device is illuminated or extinguished in accordance with data from a display data source.

Other objects and advantages of the invention will become apparent from the following detailed description, with reference being made to the accompanying drawings.

BRIEF DESCRIPTION OF THE DRAWINGS

FIG. 1 is a sketch showing a typical segment arrangement for a seven-segment readout device;

FIG. 2 is a block diagram of apparatus according to the present invention for verifying the operation of a segment type readout device; and FIG. 3 is a detailed schematic block diagram of a device according to the present invention for verifying the operation of a display composed of a plurality of seven-segment indicators to which display data is multiplexed.

DESCRIPTION OF THE PREFERRED EMBODIMENTS

Referring now to FIG. 1, a sketch is shown of the segment layout for a typical seven-segment readout device. The seven segments, which have been labeled $a$ through $g$, may be illuminated by any conventional means. For the following description, it will be assumed that the segments are of a gas discharge type in which a gas in a tube is ionized when a high voltage is applied between a cathode and an anode. However, it will of course be appreciated that other illuminating means such as light emitting diodes or incandescent lamps may also be used. The numbers zero through nine may be formed by selectively energizing the seven segments. If, for example, the segments $b$ and $c$ are energized, then the number 1 will be illuminated. If, in addition, the segment $a$ is energized, the illuminated number will be changed to the number 7. From viewing FIG. 1, it will be appreciated that when the $a$, $b$ and $c$ segments on the indicator 10 are energized to display a number 7 and the segment $a$ fails, the indicator 10 will erroneously indicate the number 1. Therefore, it is desirable to have circuitry such as that provided by the present invention for verifying that each of the segments $a$ through $g$ are operating correctly. It is also desirable to verify that each segment that should be off is not illuminated and that each segment that should be illuminated is in fact illuminated.

Turning now to FIG. 2, a block diagram is shown for apparatus 11 for verifying that each segment on one or more segment type displays is operating correctly. The data to be displayed is supplied to the apparatus 11 on four data input busses 12 from an external source (not shown) and is preferably arranged in a BCD format. The data may be supplied from any conventional data source such as from a digital computer or digital control circuitry. The BCD data on the busses 12 is applied to a BCD-to-seven segment decoder 13 which has seven output lines 14 connected to the cathodes of the seven segments of a plurality of seven-segment gas discharge indicators 15. The signals on or conductive states of the lines 14 control illumination of the individual segments. A plurality of indicators 15 may be used to provide a display having a desired number of digits. The cathodes for the corresponding segments on all indicators are connected together to the seven lines 14 such that the segments are in parallel. Multiplexing techniques are used for supplying data to the indicators 15 by sequentially energizing each of the indicators 15 at a rate sufficiently fast to appear to be continuously energized. A digit selector 16 is provided for sequentially enabling the individual indicators 15 in synchronism with the display data on the busses 12.

The display data on the input busses 12 is also applied to a second BCD-to-seven segment decoder 17. Seven output lines 18 from the decoder 17 are connected to one group of inputs on a comparator 19. The lines 14 connected to the seven-segment cathodes of the indicators 15 are connected to seven monitoring circuits 20. The monitoring circuits 20 have seven outputs 21, one for each indicator segment, which are connected to a second group of inputs on the comparator 19. If each of the segments for the currently energized indicator 15 is illuminated or unilluminated as specified by the display data on the busses 12 so that such indicator 15 forms the desired character, then the signals appearing on the segment monitoring circuit outputs 21 will correspond to the signals on the seven lines 18 and the comparator 19 will apply a signal on an output 22 indicating that there is a display verification. However, if there is a difference between the signals appearing on the lines 18 and the monitoring circuit outputs 21, the comparator 19 will apply an error signal on the output 22. Thus, the apparatus 11 will verify when the indicators 15 are functioning in accordance with the data on the busses 12.

Each segment of a typical gas discharge segment type indicator may require on the order of 150 volts for illumination. For the following discussion, it will be assumed that all segment anodes for an energized indicator will be connected to a 190-volt source. When any given segment is illuminated, the voltage drop across the segment will be on the order of 150 volts. When the segment is unilluminated, the cathode-to-anode voltage drop will be on the order of 100 volts or less, depending upon the leakage current through the segment and the energizing circuit. If the segment should become open-circuited, the full 190 volts will appear between the anode and cathode of the segment. Or, if the segment should become short-circuited, the voltage drop across the segment will typically fall to within a range of 0 to 10 volts.

The apparatus 11 is designed to monitor the cathode voltage on each segment of an energized one of the indicators 15. The cathode voltage is inversely proportional to the cathode-to-anode voltage drop across the gas discharge tube for each segment. For gas discharge indicators operating at the above-described nominal voltages, it will be assumed that if the cathode voltage falls within a range of from 0 to 15 volts, then the segment will be open-circuited. If the cathode voltage falls within a range of from 15 volts to 60 volts, the segment will be assumed to be illuminated. Finally, if the cathode voltage falls within the range of from 60 volts to 190 volts, then it will be assumed that the segment is either extinguished or short-circuited if the segment should be illuminated.

gas now to FIG. 3, details are shown of the apparatus 11 for monitoring the cathode voltages on the gs discharge indicators 15. For the following, it will be assumed that the indicators 15 form a sixteen-digit display comprising 16 individual gas discharge indicators mounted in one or more rows. The individual digits of the indicators 15 are sequentially scanned or enabled by the digit selector 16 such that only one indicator 15 is illuminated at a time. Therefore, each individual indicator 15 will be one, at most, one-sixteenth of the time. However, the scanning rate is at a speed such that all of the indicators 15 appear to be continuously energized. The individual indicator 15 illuminated at any given instant may be determined by a BCD digit select address applied on four address lines 23 by the external data source connected to the data busses 12. The address lines 23 are connected to the input of a BCD-to-16 line decoder 24 which has 16 output lines operably connected to 16 power switching transistors 25. Each of the power transistors 25 has a pair of output terminals for connecting and disconnecting a 190-volt power source to all of the segment anodes of one of the indicators 15. Thus, depending upon the address applied on the lines 23, the decoder 24 will apply a signal on one of the 16 output lines for turning on an associated one of the power transistors 25. When any given power transistor 25 is conducting, 190 volts will appear on all of the segment anodes on the connected indicator 15, thereby energizing such indicator.

At the same time a given one of the indicators 15 is energized, display data is applied from the external source on the data input busses 12 for causing such indicator to display a desired character. The data input busses 12 are connected through the BCD-to-seven segment decoder and constant current driver 13 to the cathodes for all indicators 15. Thus, a first line 14' of the seven output lines 14 from the decoder 13 is connected in parallel to the a segment for each of the sixteen indicators 15. However, as stated above, only one of the indicators 15 is energized at any given time by the digit selector 16 and only the energized indicator 15 will be illuminated. The external data source is also connected to an enable input 27 to the decoder 13. The decoder 13 is enabled only after an address is applied on the lines 23 to select the indicator 15 to which the data on the busses 12 applies.

The BCD display data busses 12 are also connected through the BCD-to-seven segment decoder 17 to the comparator 19. The comparator 19 should have a capacity for comparing at least 8-bits and it may, for example, consist of two integrated circuit 4-bit comparators connected together. The seven output lines 18 from the decoder 17 are connected to seven inputs of one group of eight inputs to the comparator 19 while the eighth input is connected through a current limiting resistor 28 to a 5-volt power source. The monitoring circuits 20 are connected through amplifiers 29 to the output lines 21 which are in turn connected to the first seven of the second group of eight inputs to the comparator 19 while the eighth input is connected directly to a 5-volt power source. As long as the energized one of the indicators 15 is operating properly, the two groups of eight inputs to the comparator 19 will be identical and a verification signal will appear on the output 22 from the comparator 19. However, should the two groups of inputs differ, the lack of comparison will cause an error signal to appear on the output 22. A test switch 30 is provided for temporarily inducing an error signal on the output 22. When the test switch 30 is momentarily closed, the eighth input on the first group of inputs to the comparator 19 is momentarily grounded. Since the corresponding eighth input in the second group of inputs to the comparator 19 is connected to a voltage source, there will be no comparison for this bit and an error signal is generated. Releasing the test switch 30 will cause the output 22 from the comparator 19 to return to its normal state, unless the indicators 15 are not functioning properly.

The seven monitoring circuits 20 are connected to the seven lines 14 for monitoring the cathode voltages for the seven segments of the indicators 15. For simplicity, only one circuit 20' of the seven identical monitoring circuits 20 is shown in detail in FIG. 3. The monitoring circuit 20' has an input connected to the line 14' which extends between the decoder 13 and the a segment cathodes of the indicators 15. The line 14' is connected through a diode 31 and a resistor 32 to the base or control electrode of a PNP transistor 33. A 60-volt power source is connected directly to the emitter of the transistor 33 and also through a resistor 34 to the base of the transistor 33. The collector of the transistor 33 is connected to ground through a voltage divider comprising two series resistors 35 and 36. The junction between the resistors 35 and 36 is connected through an amplifier 29' to the first one of the second group of inputs to the comparator 19. The transistor 33 is biased to monitor for an anode-to-cathode voltage drop on the a segments falling within a range of less than 130 volts, or a cathode voltage of from about 60 volts up to the 190 volts on the anode of the energized a segment. Thus, the signal applied on the first one of the second group of inputs to the comparator 19 will be at a first logic level when the a segment cathode voltage is less than 60 volts as when a segment is either illuminated or open-circuited or more than 60 volts as when the segment is either unilluminated or short-circuited.

A second transistor 37 is provided for determining when the a segment cathode voltage is less than 15 volts. The line 14' from the decoder 13 is connected through a diode 38 and a resistor 39 to the base or control electrode of the transistor 37. A 15 volt power source is connected to the emitter of the transistor 37 and through a resistor 40 to the base of the transistor 37. The collector of the transistor 37 is connected through a resistor 41 to a buss 42 which is connected in parallel to the remainder of the monitoring circuits 20. The buss 42 is connected through an inverter 43 to the eighth one of the first group of inputs to the comparator 19, along with the test switch 30. In the event that the cathode voltage on the line 14' drops below 15 volts, as caused by an open a segment, the circuit monitor 20' will apply a signal on the buss 42 which causes the inverter 43 to ground the eighth input of the first group of inputs to the comparator 19, resulting in an error signal on the comparator output 22. A similar signal will be applied on the buss 42 by another one of the monitoring circuits 20 in the event that one of the other segments b through g is open.

In operation of the apparatus 11, the first inputs to the first and second groups of inputs to the comparator 19 will normally compare. However, three conditions will result in a failure for these inputs to compare. There will be a lack of comparison if a shorted a segment is energized. There will also be a lack of comparison if an a segment is unilluminated when it should be illuminated, as caused by, for example, a defect in the decoder 13 or a break in the line 14. Finally, there will be a lack of comparison if an a segment is illuminated when it should not be, as caused by a defect in the decoder 13 or a short between either the line 14' and another line 14 or the a segment and another energized segment. The second through seventh inputs to the comparator 19 operate in a similar manner for the b through g segments, respectively. The eighth inputs to the comparator 19 will compare unless either the test switch 30 is momentarily closed or an energized one of the segments a through g is open-circuited. Thus, it will be appreciated that the apparatus 11 not only verifies that the segments in an indicator 15 are neither open-circuited nor short-circuited, but it also verifies that the segments are illuminated when they should be and unilluminated when they should be.

It will be appreciated that various modifications and changes may be made in the above-described apparatus 11. For example, the monitored voltage levels will change depending upon the manner in which the indicator segments are illuminated. The principles of the present invention may be used, for example, with indicators having segments illuminated by means of incandescent lamps or light emitting diodes in place of the gas discharge tubes. The apparatus 11 may also be adapted to other types of indicators. For example, the apparatus 11 may be adapted for use in segment type indicators having more than seven segments, such as a 16 segment indicator adapted to display the entire alphabet in addition to the numbers zero through nine. Various other changes and modifications may be made in the apparatus 11 which will be apparent to those skilled in the art without departing from the spirit and the scope of the claimed invention.

What I claim is:

1. A character display for operation from a data source comprising, in combination, at least one indicator having a plurality of electrically energized character forming segments which become illuminated when energized, means responsive to data from the source for selectively energizing said segments to define predetermined characters, and means for generating an error signal when any of said segments fails to illuminate or extinguish in accordance with data from the source.

2. A character display, as set forth in claim 1, and including a plurality of indicators each having a like plurality of electrically energized character forming segments, and means for multiplexing data from the source to said indicators, said multiplexing means including means for sequentially enabling each indicator as data for such indicator is available from the source.

3. A character display, as set forth in claim 2, wherein each segment of each indicator is illuminated by passing a current between first and second electrodes in a gas discharge tube defining such segment, wherein said energizing means includes means connecting the first electrode for each segment on each indicator to the first electrodes of all corresponding segments of said indicators, and wherein each indicator is enabled by connecting said second electrodes for all segments on such indicator to a power source.

4. A character display, as set forth in claim 3, wherein said error signal generating means includes means responsive to an open circuit on any segment of an enabled indicator for generating an error signal.

5. A character display, as set forth in claim 1, wherein said error signal generating means includes means responsive to an open circuit in any segment of said indicator for generating an error signal.

6. A circuit for verifying the correct operation of an indicator operated from a data source, said indicator having a plurality of electrically energized character forming segments which become illuminated when energized, each segment having a first high voltage drop when open-circuited, a second voltage drop lower than such first voltage drop when illuminated, a third voltage drop lower than such second voltage drop when extinguished and a fourth voltage drop lower than such third voltage drop when short-circuited, said apparatus comprising, in combination, means responsive to data from the source for selectively energizing said indicator segments to define predetermined characters, a comparator having two corresponding groups of inputs, said comparator generating a verification signal when the two groups of inputs are identical and an error signal when the two groups of inputs are different, means for applying the data from the source to a first of said groups of comparator inputs, a plurality of electronic switch means, means connecting a different one of said switch means to each of said indicator segments for monitoring the voltage drop across said segments, each of said switch means having a first state of conducion when the voltage drop across the connected segment exceeds a predetermined voltage between said second and third voltage drops and a second state of conduction when the voltage drop across the connected segment is less than the predetermined voltage, and means connecting said switch means to the second of said groups of comparator inputs, said connecting means applying signals on said second group of comparator inputs corresponding to the signals on the first group of inputs when all of the indicator segments are illuminated and extinguished in accordance with the data from the source and applying a different input for any segment which fails to illuminate or extinguish in accordance with the data from the source.

7. A circuit for verifying the correct operation of an indicator, as set forth in claim 6, and including means for applying a predetermined signal to one input in one of said groups of comparator inputs and means for applying a similar signal to the corresponding input in the other group of comparator inputs when the voltage drop across any indicator segment is less than a second predetermined voltage between such first and second voltage drops and for applying a different signal to the corresponding input when the voltage drop across any indicator segment exceeds such second predetermined voltage whereby said comparator generates an error signal when any indicator segment is open-circuited.

* * * * *

UNITED STATES PATENT OFFICE
CERTIFICATE OF CORRECTION

PATENT NO. : 3,866,171
DATED : February 11, 1975
INVENTOR(S) : Richard C. Loshbough It is certified that error appears in the above-identified patent and that said Letters Patent are hereby corrected as shown below:

Column 2, line 54, after the comma (,) insert -- then --.

Column 3, line 20, after "fast" insert -- as --.

Column 4, line 11, "gas" should read -- Turning --; line 12, "gs" should read -- gas --; line 20, "one," should read -- on, --.

Column 5, line 50, omit underscoring.

Column 8, line 4, "conducion" should read -- conduction --.

Signed and sealed this 20th day of May 1975.

(SEAL)
Attest:

RUTH C. MASON
Attesting Officer

C. MARSHALL DANN
Commissioner of Patents
and Trademarks